Inventor
A. E. W. Johnson
Arnt W. Wessman
By H. P. Doolittle
Atty.

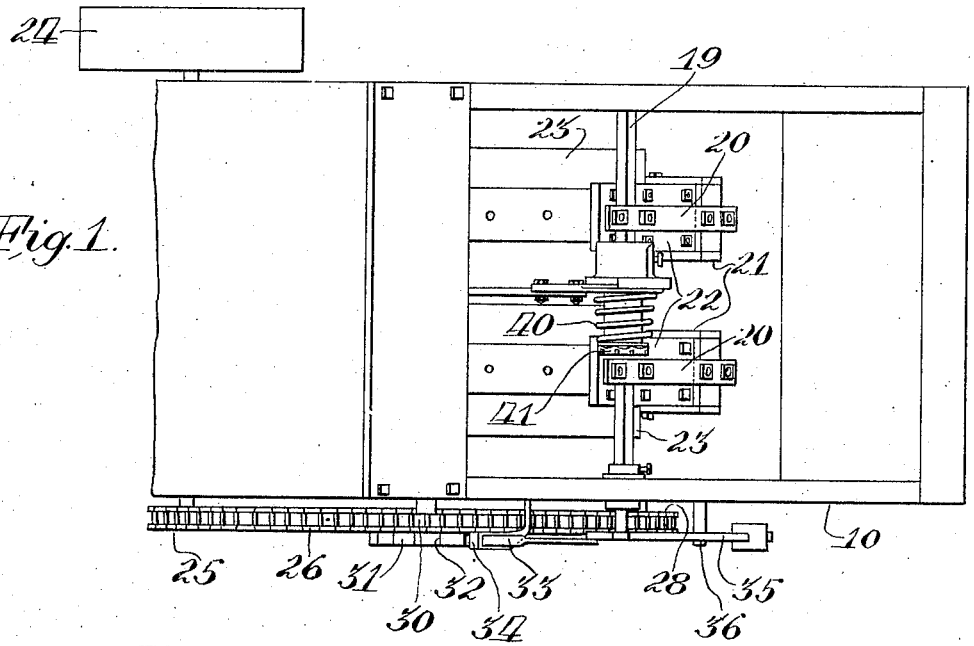
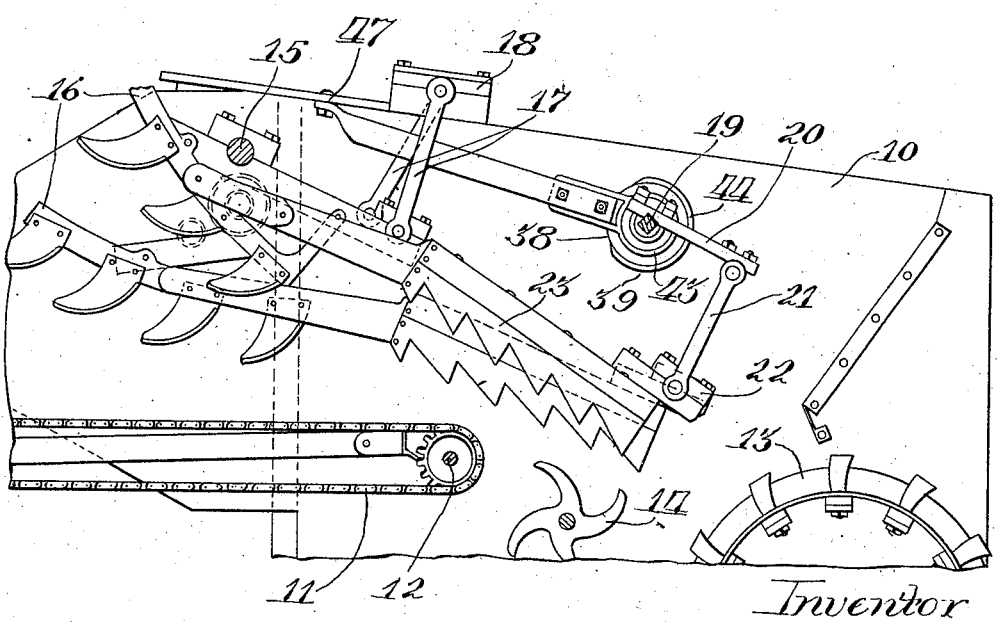

Patented July 1, 1930

1,768,985

UNITED STATES PATENT OFFICE

ARNOLD E. W. JOHNSON AND ARNT W. WESSMAN, OF CHICAGO, ILLINOIS, ASSIGNORS TO INTERNATIONAL HARVESTER COMPANY, A CORPORATION OF NEW JERSEY

FEEDER FOR THRASHERS

Application filed October 16, 1929. Serial No. 399,940.

The invention is in the art of thrashing and relates especially to improvements in feeders for thrashing machines.

These feeders have become standardized and comprise a feeder conveyer for moving bundles of grain into the thrasher. Cooperating with the conveyer are band-cutting knives and straw-rake devices. These knives and rakes are carried and actuated by a crank shaft. The rakes may float upwardly to conform with a large increment of material, and if such float is extreme, a rockshaft is caused to be rocked, which in turn actuates a trip that controls a clutch to stop the drive to the main conveyer, so that temporarily no more material will be fed by the feeder. The rockshaft must be rocked against the force of a spring or a weighted arm, so that the rakes automatically may return to normal working position, and so that the clutch trip may be automatically removed to resume operation of the feeder. The crank shaft mentioned travels at high speed and the rockshaft is rocked frequently to perform the regulatory function mentioned. This results in much objectionable vibration that interferes with the steady, even feed of material to the thrasher. This vibration in the crank and rock shafts is, of course objectionable for a good many other reasons, and, therefore, it is highly desirable that the same be eliminated, or, at least, considerably minimized.

Accordingly, it is the main object of this invention to provide a stabilizer, or vibration damper, for use in connection with a thrasher feeder mechanism.

Generally, it is an object of the invention to improve the operation of band cutters and feeders for thrashers.

Other objects will become known as the disclosure is made.

Briefly, these desirable objects are achieved by providing spring-pressed friction members that act on the rock-shaft to stabilize the same, thereby damping vibration thereof and of its connected parts.

In the drawings illustrating one practicable form of the invention,—

Figure 1 is a plan view of the improved feeder;

Figure 2 is a side elevational view thereof with the proximate side wall removed to illustrate the feeder mechanism;

Figure 3:
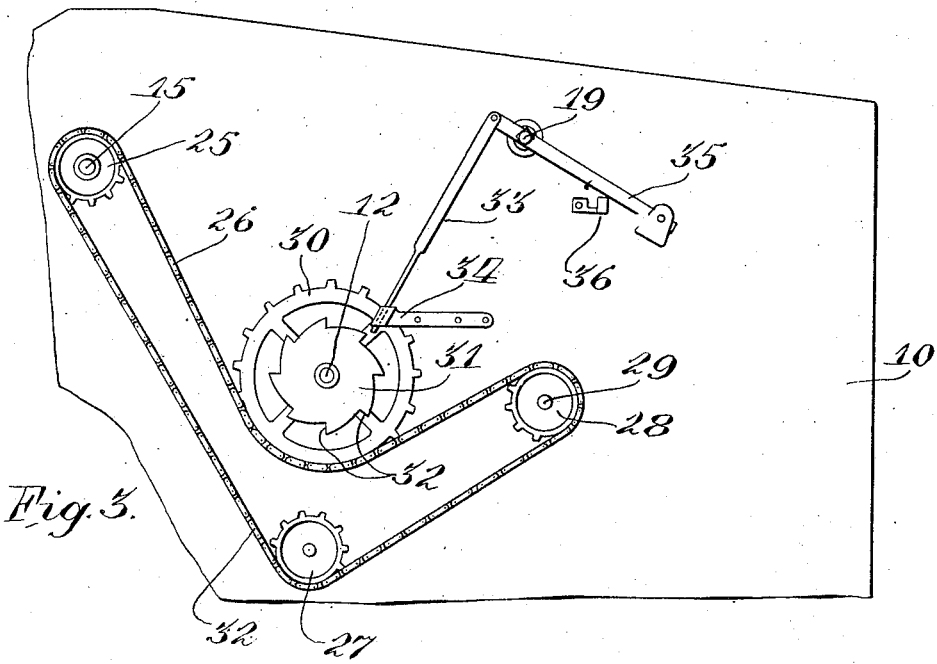
Figure 3 is a side view showing the exterior drive and control mechanism.
Figure 5:
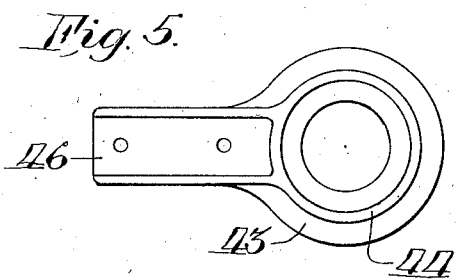
Figures 5 and 6 are detail views of the cooperable friction elements employed in the stabilizer.
Figure 4:
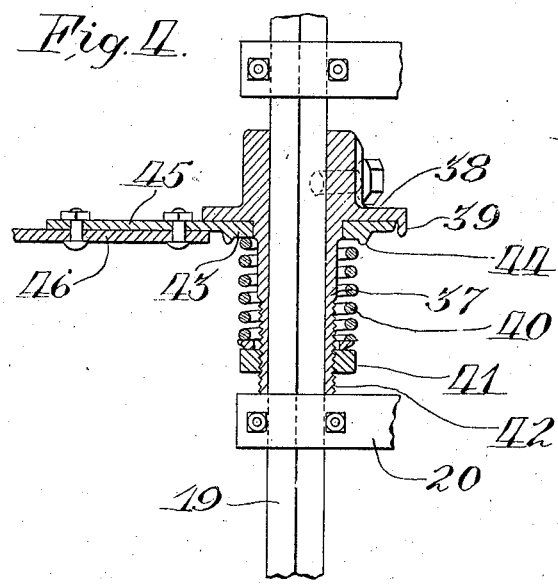
Figure 4 is a plan, detail view, partly in section, of the stabilizer.
Figure 6:
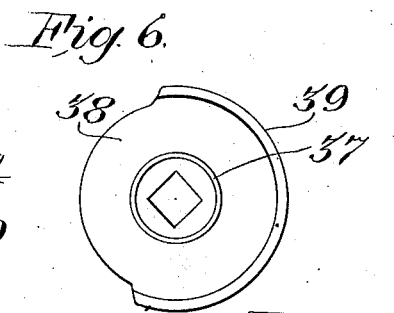

The self feeder shown, as in standard practice, comprises a housing 10, in the lower front end of which is arranged the feeder conveyer 11, driven from a shaft 12. The thrashing cylinder appears at 13, and between it and the discharge end of the conveyer 11 is the retarder 14. At the front, upper end of the housing is a transverse crank shaft 15 which carries and operates with reciprocatory movement in the orbital paths, the band cutter knife members 16, which have their rear ends carried by links 17 connected pivotally in the block 18 at the top of the housing.

A transverse rockshaft 19 is carried in the housing, as shown, the same having rigidly connected thereto a pair of spaced, rearwardly extending arms 20, each of which pivotally carries a depending link 21. Each link 21 has its lower end pivotally connected in a block 22, said blocks carrying rake elements 23 which are rigidly connected at their front ends to the knife members 16, heretofore described.

The shaft 15 may be driven from a pulley 24. This turns a sprocket wheel 25 (see Figure 3) to drive a chain 26, trained around a sprocket wheel 27, and another sprocket wheel 28, which drives a shaft 29 to operate the retarder 14, already mentioned. This chain also drives a large, loosely mounted sprocket wheel 30, connectible and disconnectible, as usual in these feeders, relative to a clutch part 31 fast on the conveyer shaft 12. This part embodies the usual stop shoulders 32 that cooperate with a trip 33 slidable through a guide 34, which is mounted on the housing 10. The guide is connected to a weighted arm 35 carried on the rockshaft 19 to rock therewith. A stop 36 is provided as a normal rest for this weighted arm, which acts to hold the working end of the trip 33 clear of the shoulders 32, so that the clutch part 31 and sprocket wheel 30 normally turn together to drive the shaft 12 and feeder conveyer 11.

When a too large increment of material encounters the rake devices 23, they float upwardly to rock the shaft 19, and, if the movement reaches a predetermined maximum, obviously the weighted arm 35 will be raised to such an extent as to cause the trip 33 to be moved downwardly into the path of movement of the clutch part 31. When the trip is contacted by a shoulder 32, the clutch part and shaft 12 are stopped to hold the conveyer 19 idle. The rakes 23, of course, continue to feed to the cylinder 13, and as soon as the bunched material has been disposed of, the rakes 23 return to normal position. Likewise, the weighted arm moves to free the trip from the clutch part to cause resumption of the movement for the feeder 19.

As the rakes 23, knives 16, and shaft 15 operate at high speed, considerable vibration results. Likewise, the repeated operation of the rockshaft 19 causes the weighted arm to hammer on its rest 36. To overcome the vibration and hammering described, a stabilizer has been provided, which will next be described.

Substantially midway between the ends of the rockshaft 19, is made fast a sleeve 37 having a circular flange 38 provided with a rim 39. Encircling the sleeve is a spring 40, the tension of which may be varied by a nut 41 movable along a threaded portion 42 in an obvious manner. Another disk 43 surrounds the sleeve and is pressed flatly against the flange 38 by the spring, said spring nesting within the seat 44 provided on the disk 43 for that purpose. The disk 43 embodies an extension 45 to which is secured an arm 46, said arm, as best shown in Figure 2, being made fast at 47 to the roof of the housing 10.

Thus, in effect, are provided two friction elements comprising the stationary disk 43 and the turnable disk or flange 38. The frictional engagement between adjacent faces of these disks may be varied by altering the tension of the spring 40 by means of the nut 41. This friction thus checks, or dampens, vibration of the rockshaft 19 and all movable parts, such as the rakes 23, knives 16, crank shaft 15, and weighted arm 35, connected therewith. Further, when the weight arm 35 is working too easily, or too quickly, the stabilizer may be adjusted by the tightening nut 41, which causes said arm to return to its normal position gradually, and, as a result, more uniform feeding can be obtained.

From the above description, the use and operation of the stabilizer will now be clear. Also, it can be appreciated that the structure achieves all of the desirable objects heretofore recited.

The scope of the invention is set forth in the following claims.

What is claimed is:

1. In a feeder for thrashers, a housing, a plurality of shafts in the housing, rake devices connected to and operated by one of the shafts, and a stabilizer associated with another of the shafts to dampen vibration in the shafts and connected parts.

2. In a feeder for thrashers, a housing, a plurality of shafts in the housing, rake devices connected to and operated by one of the shafts, and a friction device associated with another of the shafts to stabilize the shafts and connected parts against vibration.

3. In a feeder for thrashers, a housing, a plurality of shafts in the housing, rake devices connected to and operated by one of the shafts, and a yieldable friction device carried on another of the shafts to stabilize the shafts and connected parts against vibration.

4. In a feeder for thrashers, a housing, a plurality of shafts in the housing, rake devices connected to and operated by one of the shafts, and spring pressed friction disks carried on another of the shafts to stabilize the shafts and connected parts against vibration.

5. In a feeder for thrashers, a housing, a crank shaft therein, a rockshaft therein, rake and knife devices connected between the shafts, a feeder, means for rocking the rockshaft when a large mass of material is fed by the feeder, and a stabilizer associated with the rockshaft to dampen vibration in the shafts and rake and knife devices.

6. In a feeder for thrashers, a housing, a crank shaft therein, a rockshaft therein, rake and knife devices connected between the shafts, a feeder, means for rocking the rockshaft when a large mass of material is fed by the feeder, a weighted trip arm carried by the rockshaft, and a stabilizer associated with said rockshaft to dampen vibration in the shafts and connected parts.

7. In a feeder for thrashers, a housing, a crank shaft therein, a rockshaft therein, rake and knife devices connected between the shafts, a feeder, means for rocking the rockshaft when a large mass of material is fed by the feeder, a stabilizer to dampen vibration of the shafts and connected parts, the stabilizer comprising a disk fast on the rockshaft, a cooperable disk frictionally engaging the first disk, and a support to carry said latter disk.

8. In a feeder for thrashers, a housing, a crank shaft therein, a rockshaft therein, rake and knife devices connected between the shafts, a feeder, means for rocking the rockshaft when a large mass of material is fed by the feeder, a stabilizer to dampen vibration of the shafts and connected parts, the stabilizer comprising a sleeve including a disk fast on the rockshaft, a second non-turnable disk on the shaft, a support in the housing for said latter disk, and a yieldable means frictionally pressing the disks together.

9. In a feeder for thrashers, a housing, a crank shaft therein, a rockshaft therein, rake and knife devices connected between the shafts, a feeder, means for rocking the rockshaft when a large mass of material is fed by the feeder, a stabilizer to dampen vibration of the shafts and connected parts, the stabilizer comprising a sleeve including a disk fast on the rockshaft, a second non-turnable disk on the shaft, a support in the housing for said latter disk, a spring to press the disks into frictional engagement, and means to vary the tension of the spring.

In testimony whereof we affix our signatures.

ARNOLD E. W. JOHNSON.
ARNT W. WESSMAN.